United States Patent [19]
Vine

[11] Patent Number: 6,012,270
[45] Date of Patent: *Jan. 11, 2000

[54] APPARATUS FOR AUTOMATICALLY BAGGING OBJECTS

[75] Inventor: Jeffrey A. Vine, Broadway, Va.

[73] Assignee: Agri-Tech, Inc., Woodstock, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 09/026,526

[22] Filed: Feb. 20, 1998

[51] Int. Cl.$^7$ ...................................................... B65B 57/20
[52] U.S. Cl. .............................................. 53/500; 53/502
[58] Field of Search ............................... 53/459, 502, 500, 53/501, 503, 245, 535, 532, 570, 390

[56] References Cited

U.S. PATENT DOCUMENTS

| | | | |
|---|---|---|---|
| 3,416,619 | 12/1968 | McClusky | 177/123 |
| 3,705,475 | 12/1972 | Riley | 53/35 |
| 3,913,691 | 10/1975 | Powell, Jr. | 177/202 |
| 3,977,483 | 8/1976 | Greanias | 177/1 |
| 4,177,621 | 12/1979 | Powell, Jr. | 53/468 |
| 4,428,179 | 1/1984 | Jordan et al. | 53/502 |
| 5,050,370 | 9/1991 | Stederoth | 53/502 |
| 5,174,094 | 12/1992 | Powell, Jr. | 53/469 |
| 5,345,748 | 9/1994 | Powell, Jr. | 53/502 |

OTHER PUBLICATIONS

Agri–Tech, "Model 93 Bagger."
Agri–Tech, "AGRI–TECH: Harnessing The Power Of Today's Technology For The Fruit And Vegetable Industry."

*Primary Examiner*—Joseph J. Hail, III
*Assistant Examiner*—Dermott J. Cooke
*Attorney, Agent, or Firm*—Finnegan, Henderson, Farabow, Garrett & Dunner, L.L.P.

[57] ABSTRACT

A bagging system that facilitates the loading of objects into a container, includes a conveyor, hopper elements, a bagging element, and a controller. The conveyor transports the objects to be loaded into the container. The hopper elements permit objects from the conveyor to be loaded into the container in a first state and prevent objects from being loaded into the container in a second state. The bagging element holds the container to be filled with the objects from the conveyor. The bagging element includes a foot element that moveably supports the container at a number of different positions. The controller connects to the conveyor, the hopper elements, and the bagging element to control their operation. The controller initially places the foot element at an uppermost position and the hopper elements in the first state, counts the objects as the objects are loaded into the container, places the hopper elements in the second state after a predetermined number of objects have been loaded into the container, incrementally lowers the foot element as a function of the number or volume of the objects loaded into the container, and notifies an operator that the container is full when the container is filled with objects to at least a predetermined weight.

20 Claims, 12 Drawing Sheets

6,012,270

APPARATUS FOR AUTOMATICALLY BAGGING OBJECTS

FIELD OF THE INVENTION

The present invention relates generally to an object bagging system and more particularly to a system that automatically bags bruisable objects to a predetermined weight with minimal bruising.

BACKGROUND OF THE INVENTION

Conventional automatic bagging systems have long recognized a need to collect and bag objects, such as fruit, to at least a predetermined weight. These conventional systems typically include a collection pan into which the objects are collected and weighed. Once a predetermined weight is obtained, the collection pan empties the collected objects into a bag or transfers them to a separate bagging apparatus.

One conventional fruit bagging system includes a conveyor portion that consists of three rows of chain-mounted pliable square cups. A single motor drives all three rows through electric clutches. Two rows share one main clutch, and the remaining row has its own clutch and therefore operates independently of the other rows.

The cups feed the fruit into a batch hopper (i.e., a collection pan) that is mounted upon a load cell. An electronic module monitors the weight of the fruit in the batch hopper and disengages the main clutch when the weight reaches a partial weight set-point. At this point, the remaining one row of cups continues to feed fruit to the batch hopper until a target weight is sensed by the electronics. When the target weight is reached, the clutch for the single row of cups is disengaged. After a slight dwell period, a solenoid is actuated which in turn pressurizes the air cylinder disposed below the batch hopper, tilting the batch hopper and dumping the fruit into a bag, supported by a foot element. As the batch hopper dumps the fruit into the bag, an air cylinder moves the foot element downward to gently fill the bag and to facilitate removal of the filled bag.

This conventional system fills a bag to at least a predetermined weight. Other conventional systems have recognized that by exceeding this predetermined weight by the smallest amount possible, large yearly savings can be obtained. One of these conventional systems is described in U.S. Pat. No. 5,345,748 to Powell, Jr.

The Powell. Jr. system includes a primary weigh pan (i.e., collection pan) connected to a conventional load cell. The weigh pan is fed by a conveyor having a number of singulating lanes with an individual weigh chute at the end of each lane. The conveyor is controlled to stop filling the weigh pan once a certain number of objects have been loaded. The certain number of objects is a number less than the expected number of objects that will meet the minimum weight of objects to be bagged.

The individual weigh chutes are then each loaded with one object, and the individual weight or combination of weights of one or more objects from the weigh chutes is calculated. The desired individual object or combination of objects is selected to cause the weight of the objects in the weigh pan to exceed a predetermined weight by the lowest amount. The desired individual object or combination of objects is then fed into the weigh pan, and the weight in the weigh pan is confirmed. The weigh pan is then tilted to discharge the objects to separate bag holding and tying equipment.

The conventional systems described above are costly and tend to make the bagging operation slow by requiring that objects first be collected into a collection pan before being bagged by a separate bagging apparatus.

SUMMARY OF THE INVENTION

Systems and methods consistent with the principles of the present invention reduce the cost of the bagging operation and increase its speed by eliminating the need for a collection pan and a separate bagging apparatus. Also, the systems and methods reduce bruising of the objects over the conventional systems through the use of a moveable foot device.

In accordance with the purpose of the invention as embodied and broadly described herein, a system, consistent with the principles of the present invention, facilitates the loading of objects into a container and includes a conveyor, hopper elements, a bagging element, and a controller. The conveyor transports the objects to be loaded into the container. The hopper elements permit objects from the conveyor to be loaded into the container in a first state and prevent objects from being loaded into the container in a second state. The bagging element holds the container to be filled with the objects from the conveyor. The bagging element includes a foot element that moveably supports the container at a number of different positions.

The controller connects to the conveyor, the hopper elements, and the bagging element to control their operation. The controller initially places the foot element at an uppermost position and the hopper elements in the first state, counts the objects as the objects are loaded into the container, places the hopper elements in the second state after a predetermined number of objects have been loaded into the container, incrementally lowers the foot element as a function of the number or volume of the objects loaded into the container, and notifies an operator that the container is full when the container is filled with objects to at least a predetermined weight.

BRIEF DESCRIPTION OF THE DRAWINGS

The accompanying drawings, which are incorporated in and constitute a part of this specification, illustrate an embodiment of the invention and, together with the description, explain the objects, advantages and principles of the invention. In the drawings.

DETAILED DESCRIPTION OF THE PREFERRED EMBODIMENTS

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the principles of the present invention facilitate the bagging of objects to at least a predetermined weight with minimal bruising.

I. System Elements.

Figure 1:
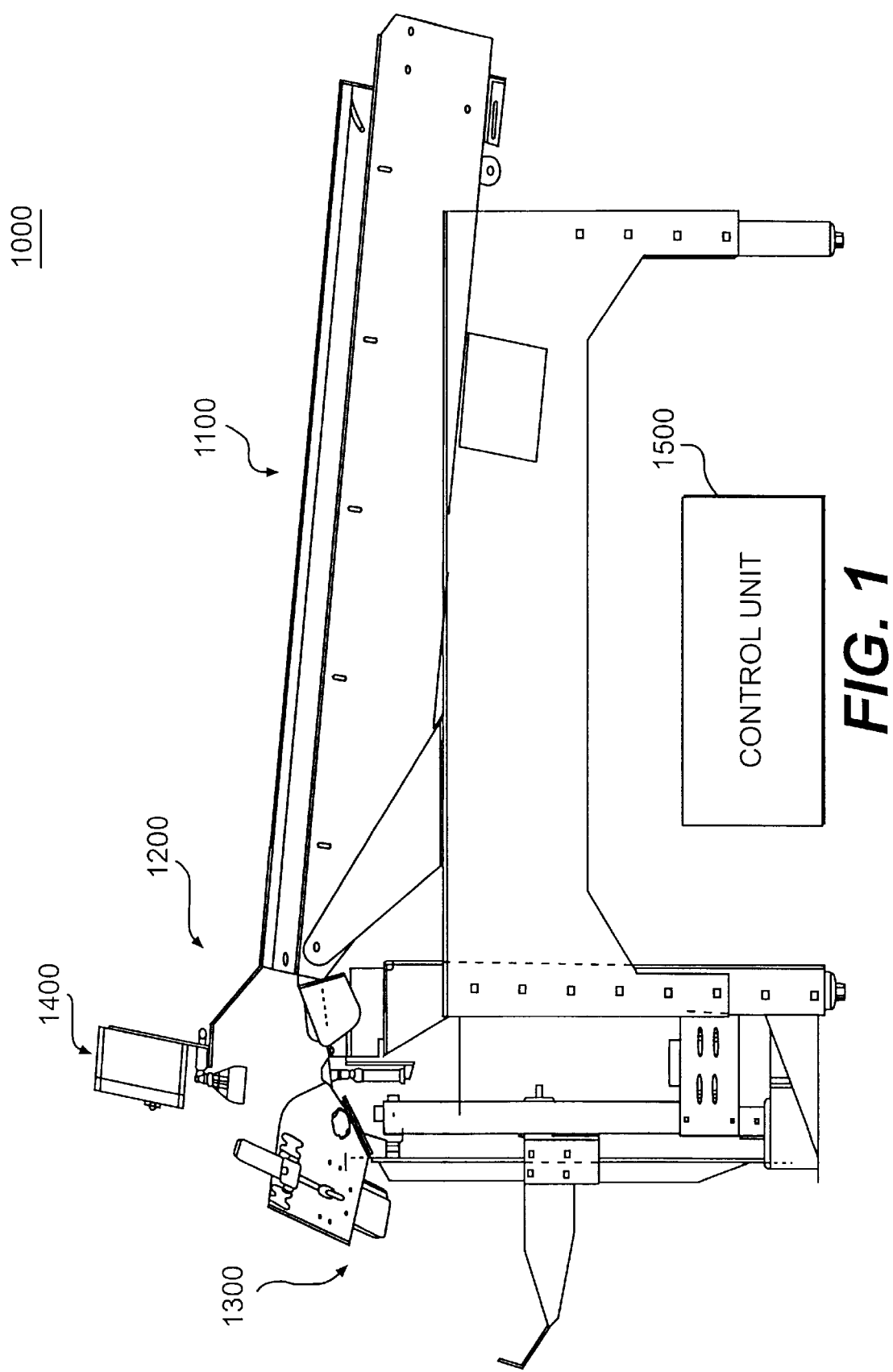
FIG. 1 is a diagram of a bagging system consistent with the principles of the present invention.

FIG. 1 is a diagram of a bagging system consistent with the principles of the present invention. Bagging system 1000 facilitates the bagging of objects, and includes conveyor belt 1100, small hoppers 1200, bag holder 1300, and user interface 1400. Bagging system 1000 also includes control unit 1500 that controls most aspects of bagging system 1000's operation. Control unit 1500 is preferably a computer, such as a personal computer or a microcontroller, with connections to conveyor belt 1100, small hoppers 1200, bag holder 1300, and user interface 1400. These connections have not been shown in FIG. 1 for simplicity.

Figure 2:
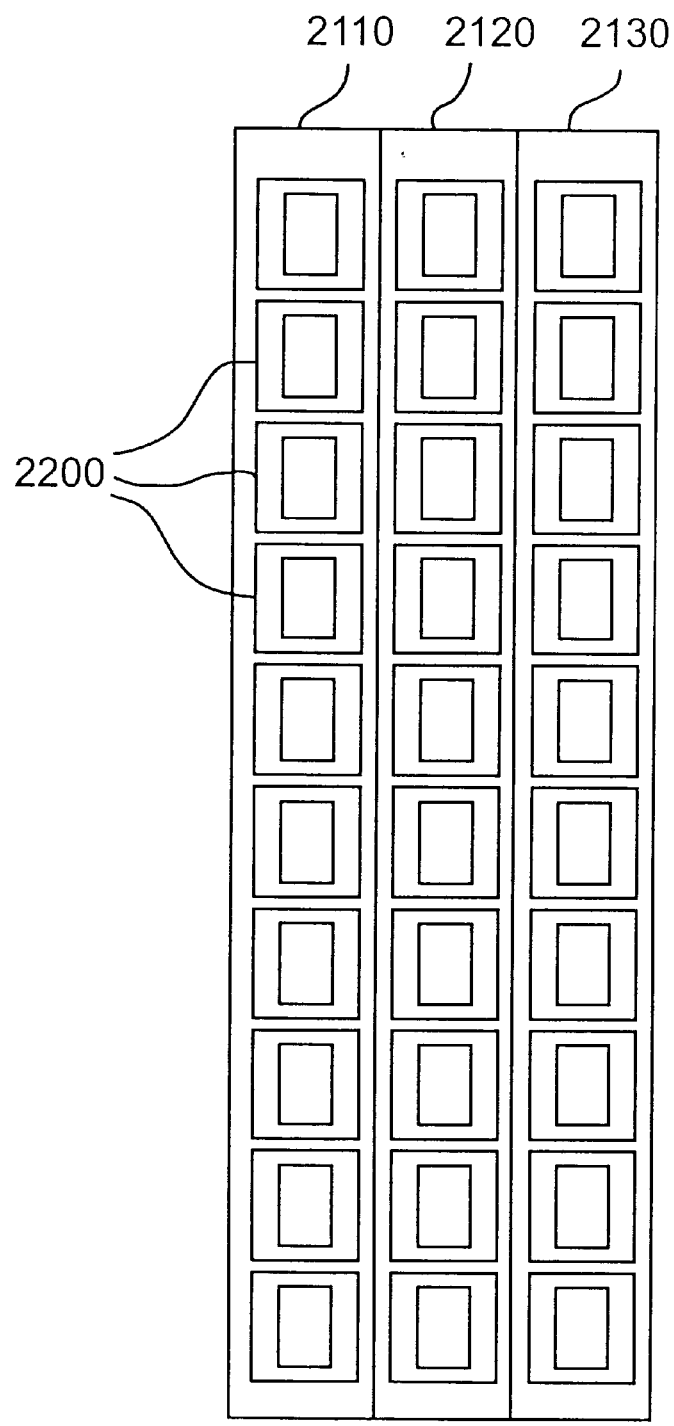
FIG. 2 is a top level diagram of the conveyor belt of FIG. 1.

FIG. 2 is a top level diagram of conveyor belt 1100. Conveyor belt 1100 receives objects, such as fruit, from adjacent loading machinery, which may include a series of belt conveyers, and transports the objects to small hoppers 1200.

Conveyor belt 1100 includes three separately controlled lanes 2110–2130 that are driven by a common motor (not shown). Lanes 2110–2130 are coupled to the motor through separate electric clutches that permit lanes 2110–2130 to be separately driven by the motor. Lanes 2110–2130 include chains to which molded cups 2200 attach in an end-to-end configuration. Cups 2200 separate the objects into the three distinct lanes 2110–2130.

Figure 3A:
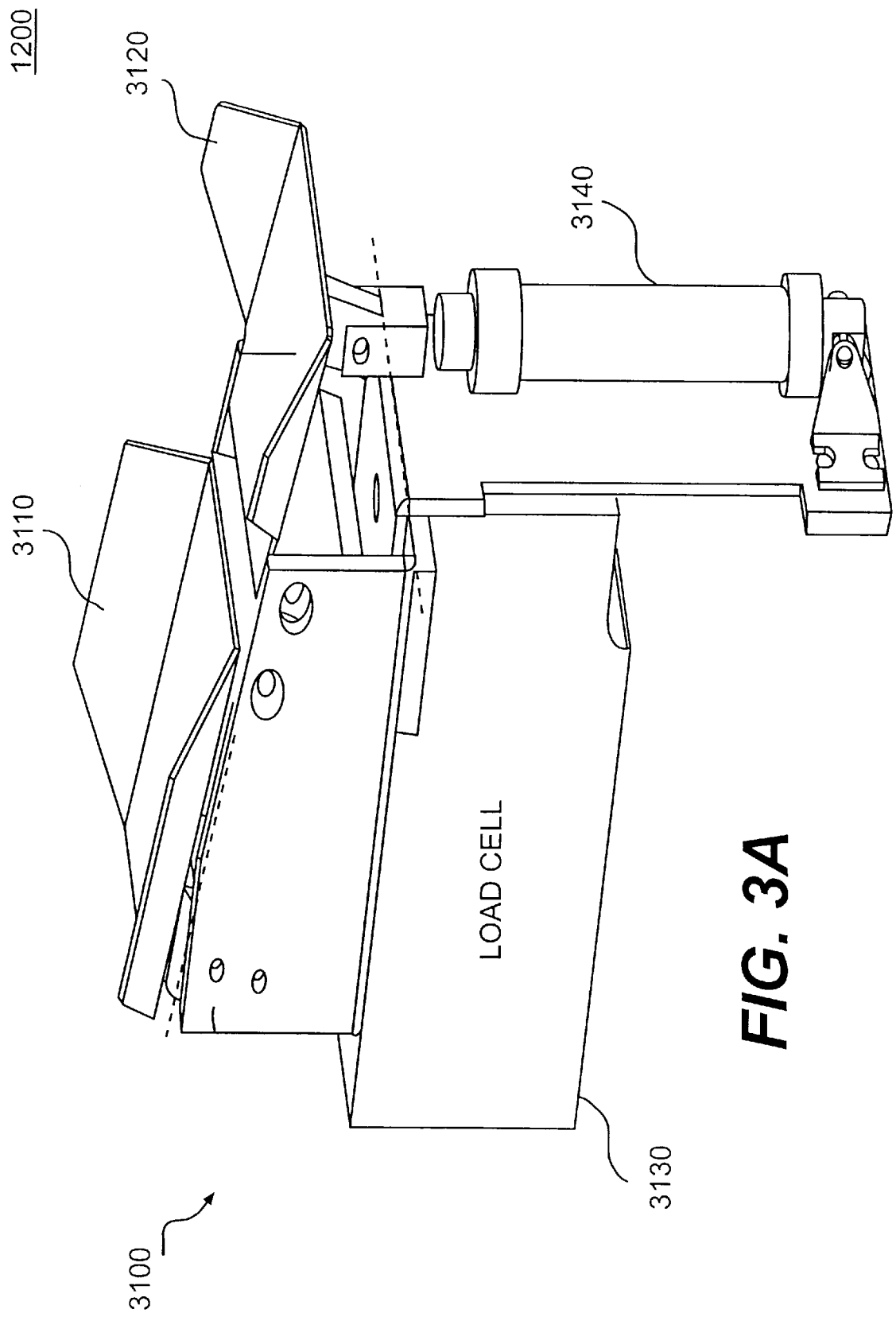
FIG. 3A is a diagram of one of the small hoppers of FIG. 1.

Each cup 2200 transports one object to small hoppers 1200. FIG. 3A is a diagram of a hopper of small hoppers 1200. While FIG. 3A shows only a single hopper 3100, small hoppers 1200 actually include three hoppers corresponding to the three lanes 2110–2130.

Hopper 3100 includes rear portion 3110, front portion 3120, load cell 3130, and cylinder 3140. Rear portion 3110 and front portion 3120 are movable to permit or prevent the objects transferred from conveyor belt 1100 to flow through to bag holder 1300. In some instances, front portion 3120 causes rear portion 3110 to move using linkage mechanisms 3115 and 3125 (FIG. 3D).

Rear portion 3110, front portion 3120, and cylinder 3140 are located on the top of load cell 3130. Load cell 3130 is a conventional mechanism for determining the weight of an object. Front portion 3120 is moveably supported by cylinder 3140. Cylinder 3140 is a pneumatic cylinder that controls the movement of front portion 3120.

Figure 3B:
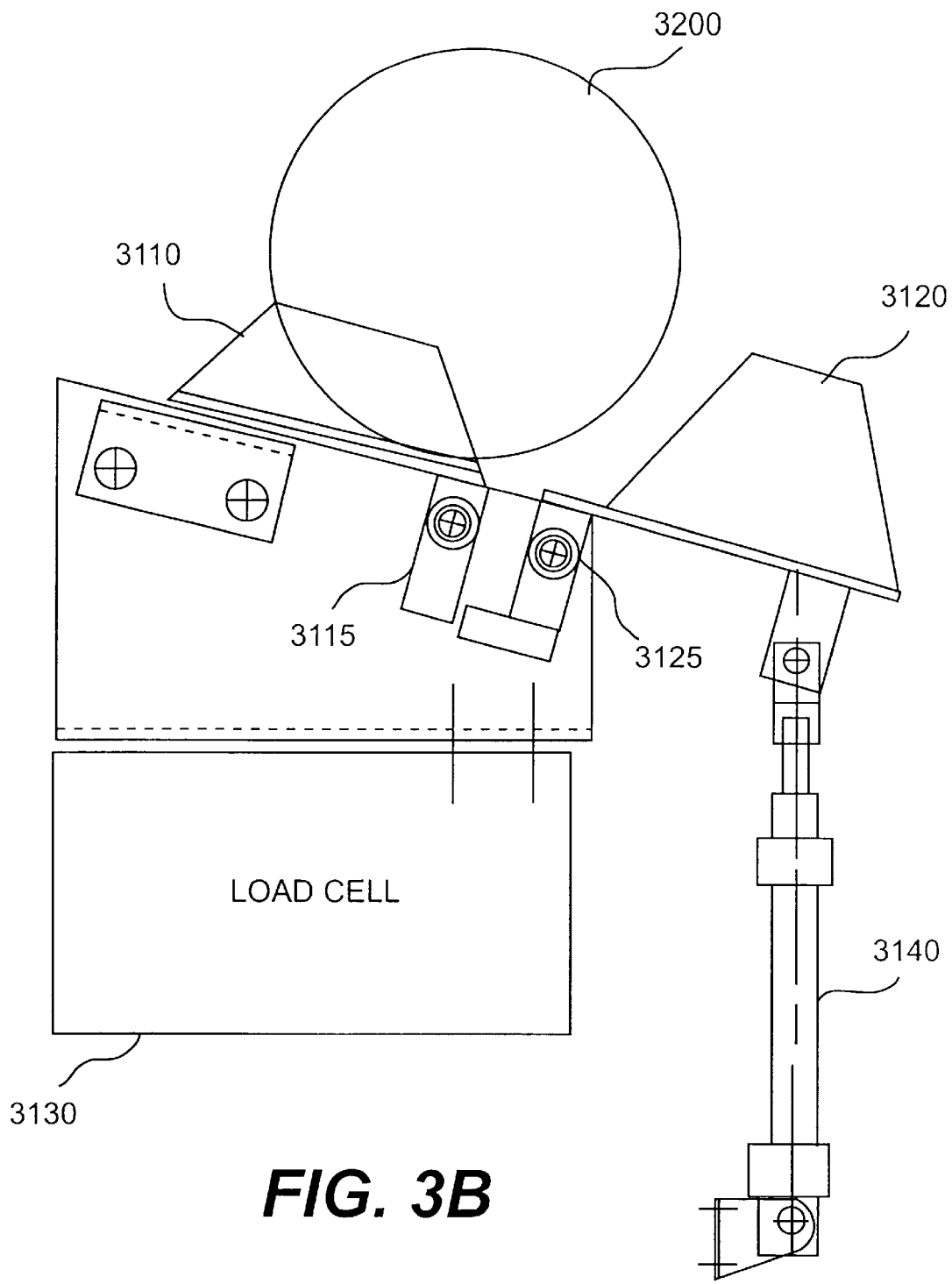
FIG. 3B is a diagram of the hopper of FIG. 3A in a bypass position.
Figure 3C:
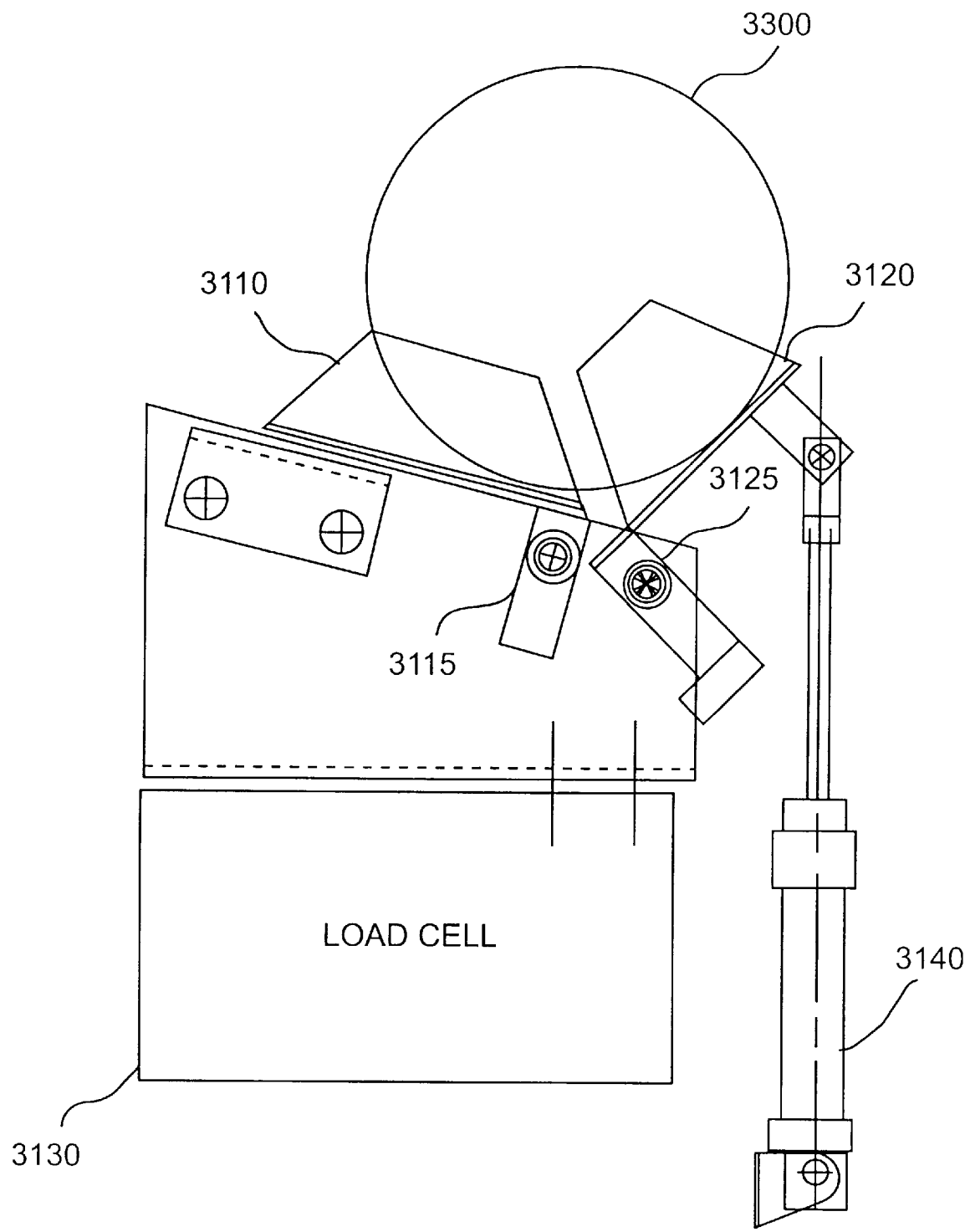
FIG. 3C is a diagram of the hopper of FIG. 3A in a stop position.
Figure 3D:
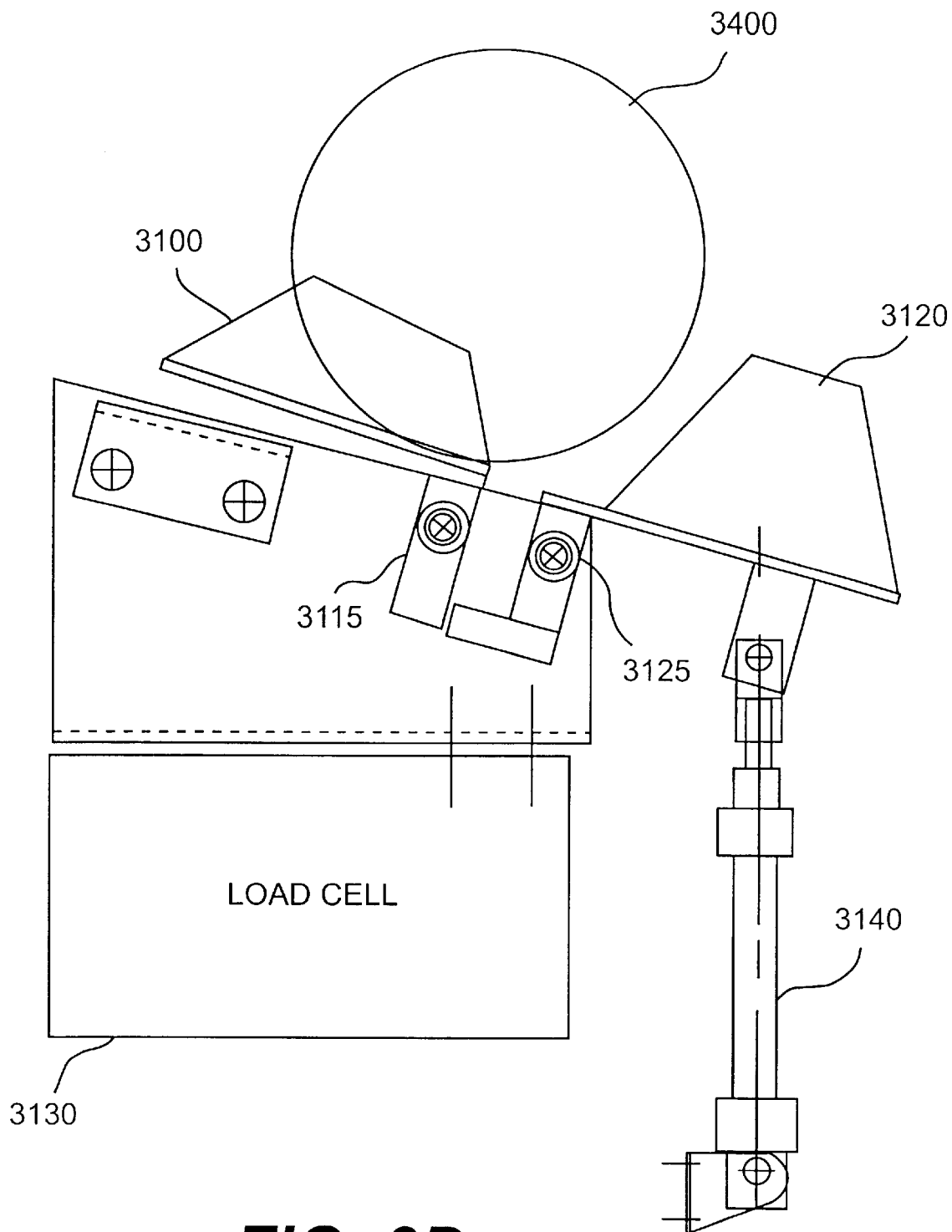
FIG. 3D is a diagram of the hopper of FIG. 3A in a discharge position.

FIGS. 3B through 3D are diagrams depicting the movement of hopper 3100 during operation of bagging system 1000 in an implementation consistent with the principles of the present invention. FIG. 3B is a diagram of hopper 3100 in a bypass position. To achieve the bypass position, cylinder 3140 moves to a lowest position and releases. When cylinder 3140 releases, a spring mechanism (not shown) causes front portion 3120 to move to a neutral, or bypass, position. In this position, object 3200 moves unimpeded through hopper 3100 to bag holder 1300. As object 3200 passes through hopper 3100, load cell 3130 generates a transient weight signal. Load cell 3130 sends the transient weight signal to control unit 1500 to allow control unit 1500 to count the number of objects passing through hopper 3100.

FIG. 3C is a diagram of hopper 3100 in a stop position. To achieve the stop position, cylinder 3140 moves to an uppermost position, thereby moving front portion 3120 to the stop position. When in the stop position, front portion 3120 prevents object 3300 from exiting hopper 3100. As front portion 3120 impedes object 3300's movement, load cell 3130 determines the weight of object 3300 and reports this information to control unit 1500.

FIG. 3D is a diagram of hopper 3100 in a discharge position. To achieve the discharge position, cylinder 3140 again moves to the lowest position, thereby moving front portion 3120 to the discharge position, below the neutral bypass position. When cylinder 3140 moves front portion 3120 to the discharge position, linkage mechanism 3125 pushes against linkage mechanism 3115, causing rear portion 3110 to raise upward slightly. With hopper 3100 in this position, object 3400 quickly exits hopper 3100 to bag holder 1300.

Figure 4:
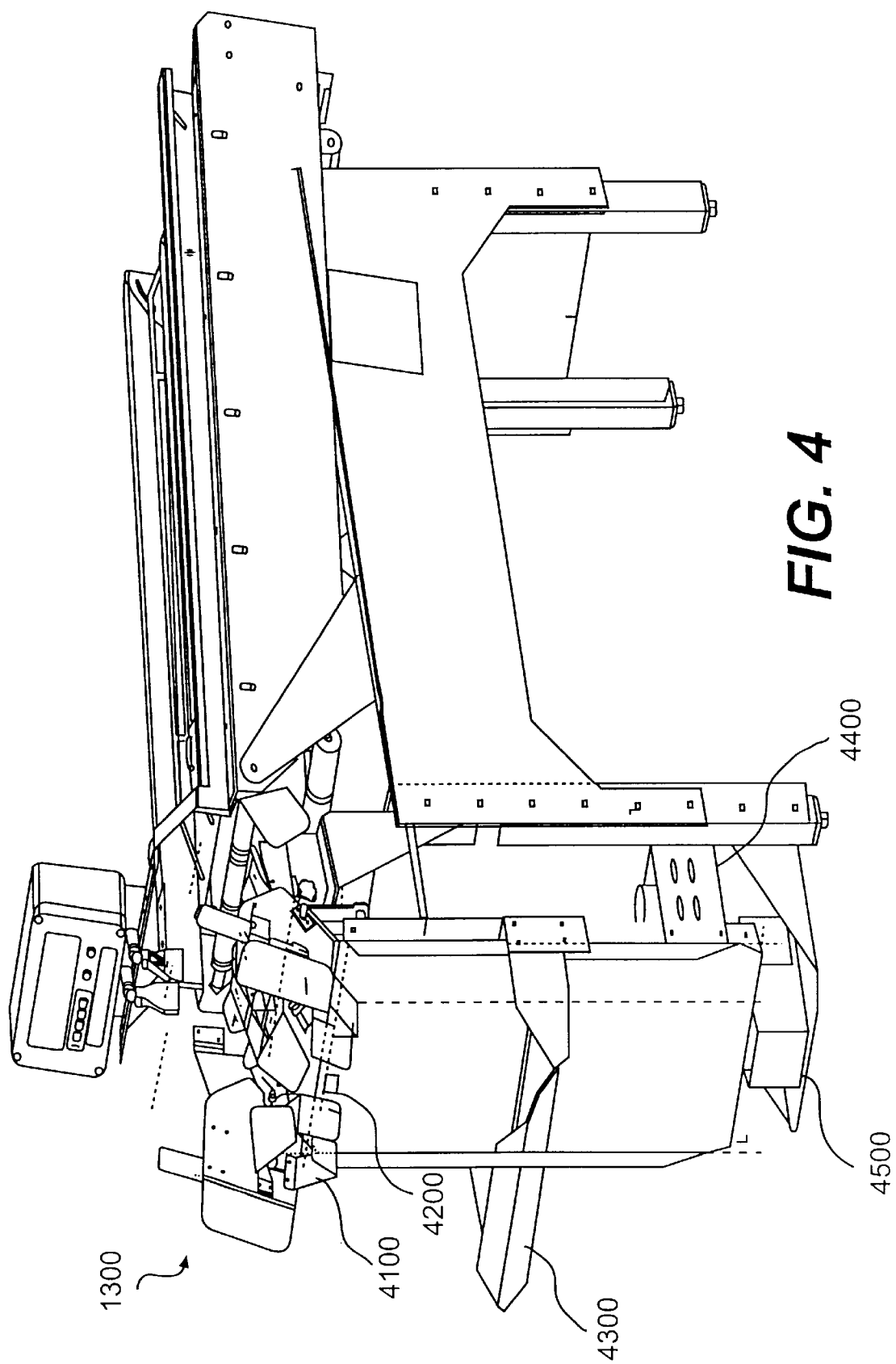
FIG. 4 is a diagram of the bag holder of FIG. 1.

Returning to FIG. 1, bag holder 1300 receives the objects exiting small hoppers 1200. FIG. 4 is a diagram of bag holder 1300, including clamps 4100, photocell 4200, foot 4300, motor 4400, and load cell 4500. Clamps 4100 hold the top edges of a bag, or a similar container, as the bag fills with objects. Clamps 4100 include airjets (not shown) to inflate an empty bag by blowing air into it and two clamping mechanisms to firmly hold the inflated bag.

Photocell 4200 is a conventional device for detecting the presence of objects. Photocell 4200 is located near the opening of the bag held by clamps 4100 and detects when objects loaded into the bag fill the bag to more than a predetermined amount. Photocell 4200 reports the detection of an object within its field of view to control unit 1500.

Foot 4300 supports the bag as it fills with objects. Foot 4300 is connected to motor 4400 by a screw-type device. The screw-type device allows motor 4400 to move foot 4300 in upward and downward directions. Motor 4400 is controlled by control unit 1500 to incrementally move foot 4300 in a downward direction as objects are loaded into the bag. Foot 4300's movement is related to the degree to which the supported bag is filled with objects, as determined by photocell 4200, to reduce the distance that the objects have to fall as the objects are fed into the bag.

Load cell 4500, located beneath foot 4300, is a conventional mechanism for determining weight. Load cell 4500 intermittently monitors the weight of the bag, and reports this information to control unit 1500.

Figure 5:
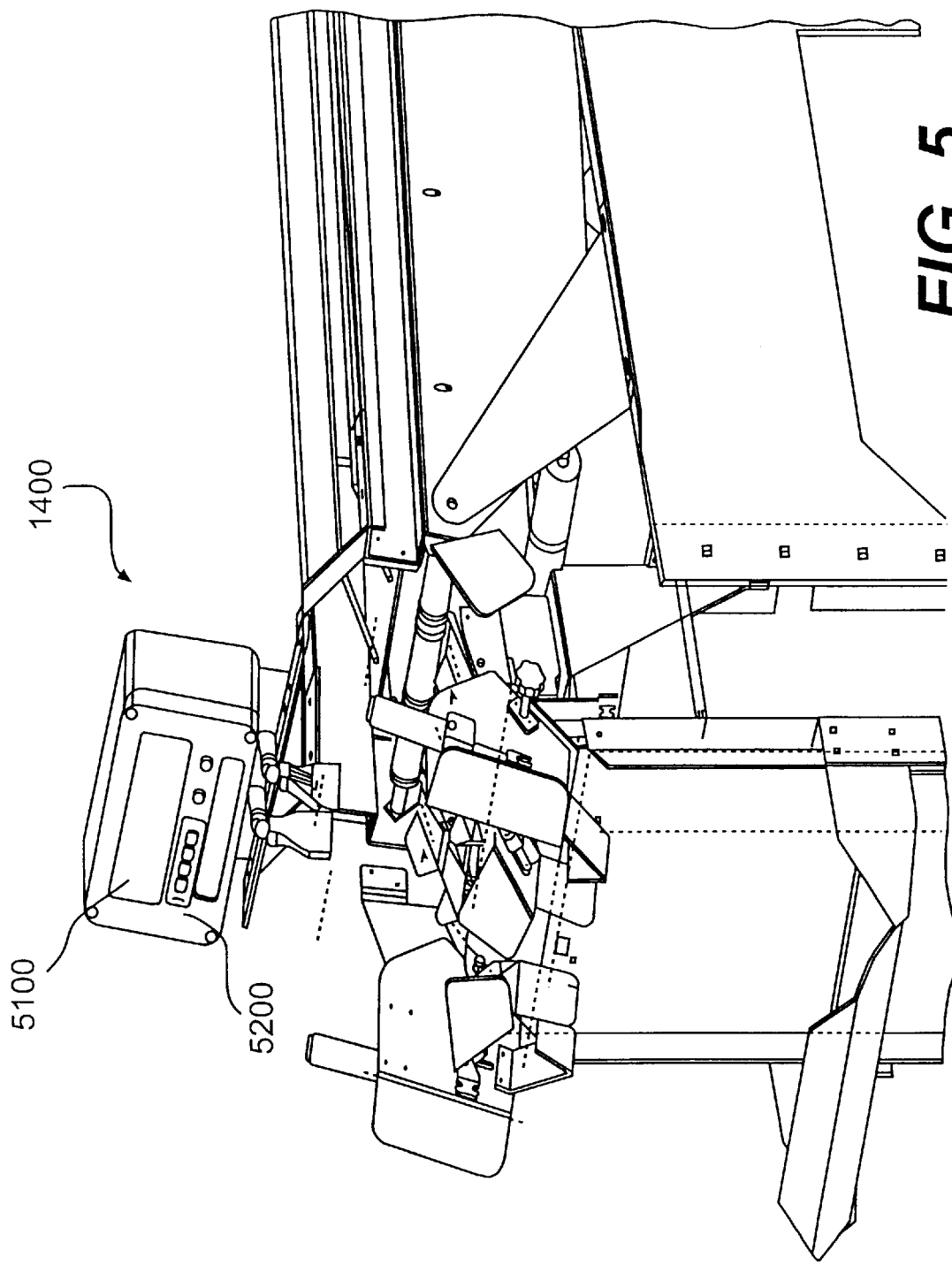
FIG. 5 is a diagram of the user interface of FIG. 1.

Returning to FIG. 1, user interface 1400 is an input/output device for use by an operator. FIG. 5 is a diagram of user interface 1400. User interface 1400 includes display 5100 and function keys 5200. Display 5100 provides an operator with important information regarding the bag filling operation, such as notifying the operator that a bag, filled with objects, is ready for removal. Function keys 5200 permit the operator to control the bag filling operation. Using function keys 5200, the operator enters, for example, bag target weight, bag size selection, and maximum object count. Other controls (not shown) may permit the operator to control the conveyor belt speed, foot movement speed, and main power on and off.

II. Processing.

Figure 6:
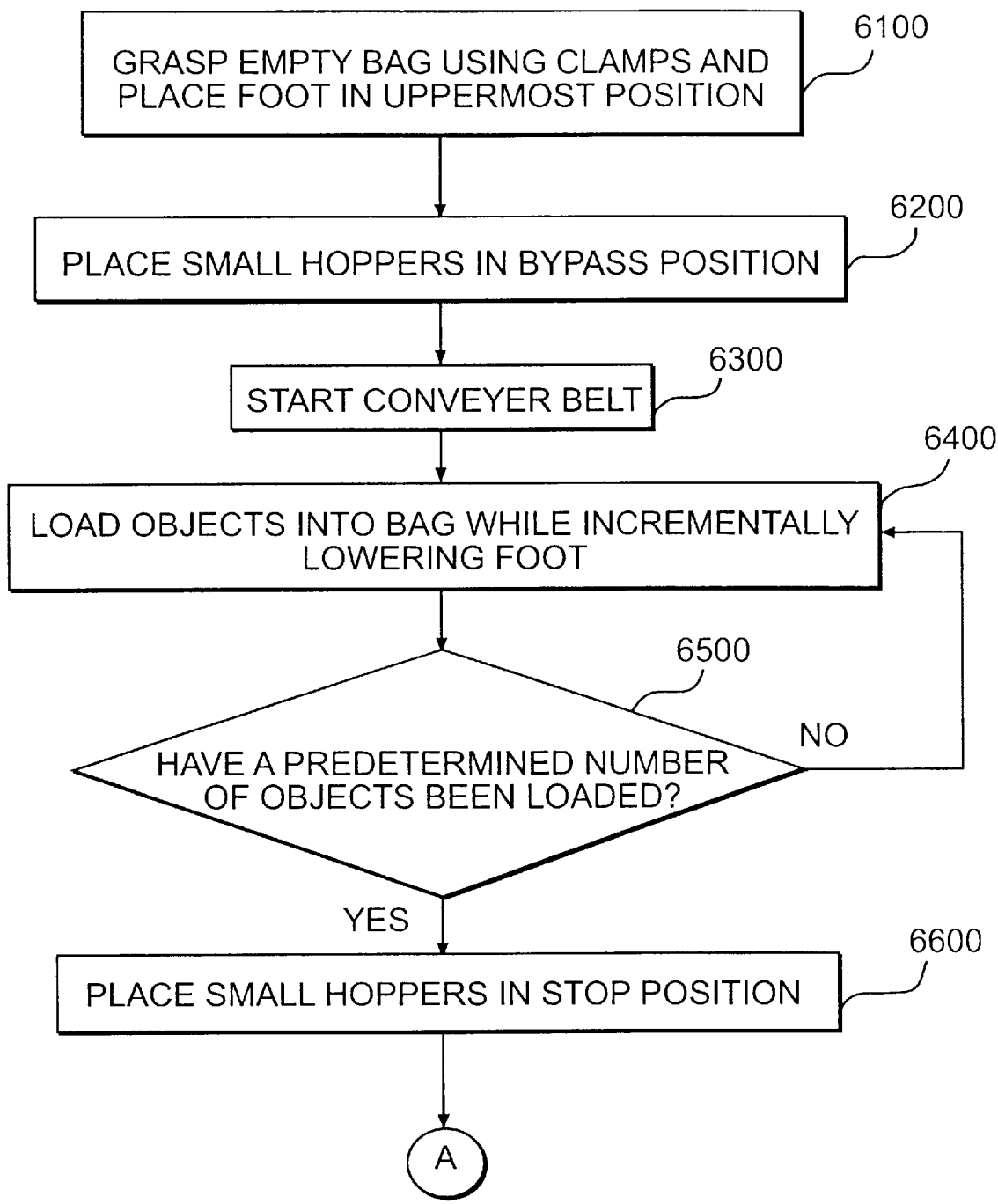
FIGS. 6 through 8 are flowcharts of a bag filling operation consistent with the principles of the present invention.
Figure 7:
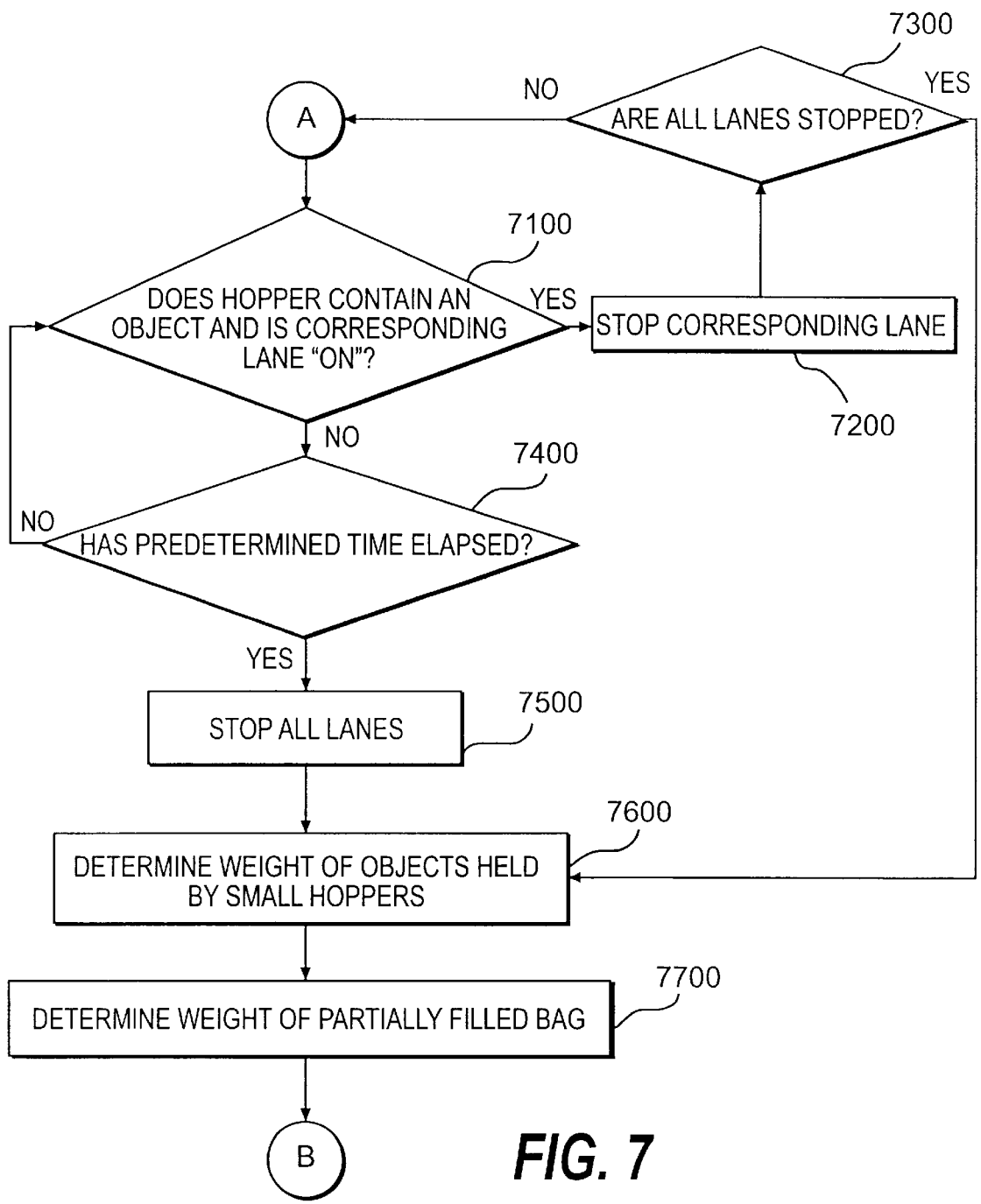
Figure 8:
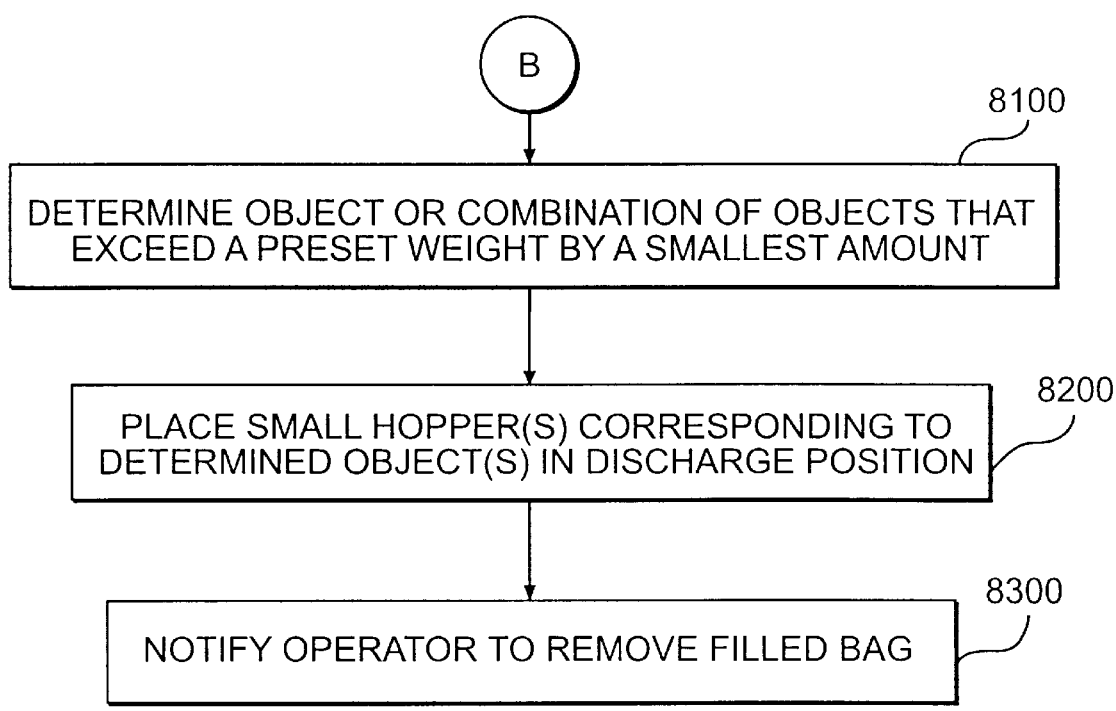

FIGS. 6 through 8 are flowcharts of a bag filling operation of bagging system 1000 consistent with the principles of the present invention. The bag filling operation will be described with reference to the bagging system described in FIGS. 1 through 5.

The bag filling operation begins when an operator pushes a start button on user interface 1400. In response, control unit 1500 sends a clamp control signal to bag holder 1300 to inflate an empty bag, or other similar object-holding container, using the air jets and grab the inflated bag using the clamping mechanisms of clamps 4100 (step 6100) (FIG. 6). Around the same time, control unit 1500 sends a foot control signal to motor 4400 to move foot 4300 to an uppermost position (step 6100).

Control unit 1500 also sends a hopper control signal to small hoppers 1200 to cause cylinders 3140 to place front portions 3120 of the hoppers in the bypass position (step 6300), and a conveyor start signal to the clutches of conveyor belt 1100 to turn the clutches on, thereby starting conveyor belt 1100 (step 6300). Conveyor belt 1100 receives objects from adjacent loading machinery and transports the objects to small hoppers 1200. Because front portions 3120 of small hoppers 1200 are in the bypass position, the objects transported by conveyor belt 1100 are fed directly into the bag held by clamps 4100 (step 6400).

As each object passes through hopper 3100, load cell 3130 detects the increased weight caused by the object. In response to the detected increase in weight, load cell 3130 generates a transient weight signal and sends the signal to control unit 1500. Based on the received transient weight signals, control unit 1500 counts the number of objects fed into the bag.

As the objects are loaded into the bag, photocell 4200 eventually detects the presence of an object near the opening of the supported bag. Each time photocell 4200 detects an object near the opening of the bag, photocell 4200 informs control unit 1500. As a result, control unit 1500 controls motor 4400 to incrementally lower foot 4300, thereby permitting more objects to be loaded into the bag (step 6400). Control unit 1500 relates the lowering of foot 4300 to the detection of objects by photocell 4200 to reduce the distance that the objects fall when fed into the bag, and thereby minimizing bruising of the objects.

As the objects are fed into the bag, control unit 1500 monitors the number of objects to determine when a predetermined number of objects have been loaded (step 6500). When the predetermined number of objects have been loaded, control unit 1500 sends a hopper control signal to small hoppers 1200 to cause cylinders 3140 to move front portions 3120 of the hoppers to the stop position (step 6600).

At this point, control unit 1500 continuously monitors the transient weight signals from load cells 3130 in small hoppers 1200 to determine when each of the hoppers contains an object (step 7100) (FIG. 7). Control unit 1500 also monitors the "engaged/disengaged" state of the clutches of conveyor belt 1100 to determine whether the corresponding lanes 2110–2130 are in the "on" or "off" state (step 7100). If one of the hoppers contains an object and its corresponding lane 2110, for example, is on, control unit 1500 sends a conveyor stop signal to the clutch associated with lane 2110 to disengage the clutch and thereby stop lane 2110 (step 7200). If either of remaining lanes 2120 and 2130 are still in the "on" state (step 7300), then control unit 1500 checks again whether each of the hoppers contains an object and its corresponding lane 2110–2130 is on (step 7100).

If all three hoppers do not contain objects, control unit 1500 determines whether a predetermined amount of time has elapsed (step 7400). That is, control unit 1500 will only attempt to fill all three hoppers within certain time constraints.

If all three hoppers do not contain objects and the predetermined amount of time has not elapsed, control unit 1500 again checks whether the hoppers contain objects and their corresponding lanes 2110–2130 are on (step 7100). If the predetermined amount of time expires before all of the hoppers are loaded with objects, control unit 1500 sends a conveyor stop signal to the clutches of conveyor belt 1100 to disengage the clutches and thereby stop lanes 2110–2130 of conveyor belt 1100 (step 7500).

Once lanes 2110–2130 have been stopped as a result of either step 7200 or 7500, load cells 3130 determine the weight of the objects in small hoppers 1200, and sends this information to control unit 1500 (step 7600). Also, load cell 4500 determines the weight of the partially-filled bag, and sends this information to control unit 1500 (step 7700). Control unit 1500 compares the weights of the individual objects in small hoppers 1200 to the weight of the partially-filled bag to determine which object, or combination of objects, to load into the bag in order to fill the bag to a weight that exceeds a preset weight by a smallest amount (step 8100) (FIG. 8).

Once control unit 1500 determines which objects to load into the bag, control unit 1500 sends hopper control signals to the corresponding hoppers of small hoppers 1200 to cause cylinders 3140 to place the hoppers in the discharge position (step 8200). When cylinders 3140 move front portions 3120 to the discharge position, the linkage mechanisms slightly raise rear portions 3110 to facilitate loading of the objects into the bag.

When the objects have been loaded into the bag, user interface 1400 notifies the operator that the bag filling operation is complete (step 8300). The operator then presses a foot switch to release clamps 4100. As the operator removes the filled bag, control unit 1500 sends a clamp control signal to bag holder 1300 to inflate an empty bag using the airjets and grab the bag using the clamping mechanisms of clamps 4100 (step 6100) (FIG. 6). The bag filling operation is then ready to begin again.

Figure 9:
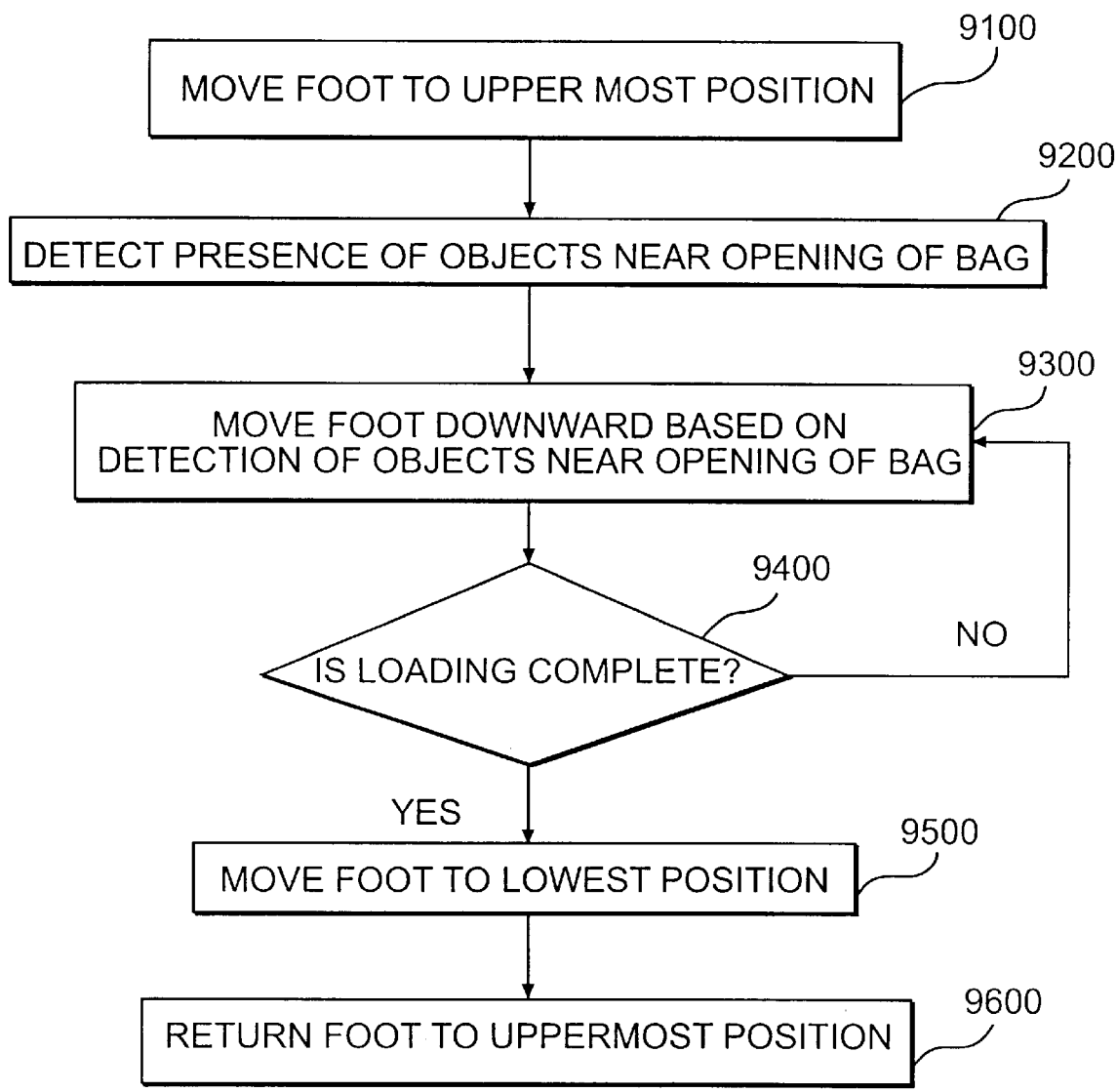
FIG. 9 is a flowchart describing the movement of the foot of FIG. 4 during a bag filling operation consistent with the principles of the present invention.

During the bag filling operation, control unit 1500 controls foot 4300 to support the bag as the bag fills with objects. FIG. 9 is a flowchart of the movement of foot 4300 during the bag filling operation consistent with the principles of the present invention.

At the beginning of the bag filling operation, control unit 1500 sends a foot control signal to motor 4400 to move foot 4300 to an uppermost position (step 9100). In this position, foot 4300 supports the empty bag. When the supported bag fills with objects to more than a predetermined amount, photocell 4200 detects the presence of an object near the opening of the bag (step 9200). In response to detection of an object, photocell 4200 sends an object detection signal to control unit 1500.

Each time control unit 1500 receives the object detection signal from photocell 4200, control unit 1500 controls motor 4400 to incrementally lower foot 4300 so that additional objects may be easily loaded into the bag (step 9300). Control unit 1500 relates the lowering of foot 4300 to photocell 4200's detection of objects to reduce the distance that the objects fall when fed into the supported bag. The degree to which foot 4300 lowers in relation to each detection of a loaded object by photocell 4200 may be preset by the operator using user interface 1400.

When object loading is complete (step 9400), control unit 1500 notifies the operator via user interface 1400. When the operator presses the foot switch to release clamps 4100, motor 4400 moves foot 4300 to its lowest position to facilitate removal of the filled bag and to permit an empty bag to be inflated and grabbed (step 9500). When the foot switch is released by the operator, motor 4400 returns foot 4300 to the uppermost position to begin the next bag filling operation (step 9600).

By controlling foot 4300 in such a manner, objects can be loaded into the bag with minimal bruising.

Systems and methods consistent with the principles of the present invention reduce bagging costs, and minimize bruising in the bagging of objects by incrementally lowering a foot, supporting a bag, as a function of the degree to which the supported bag is filled with objects.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

While the conveyor belt has been described as containing three lanes, a different number of lanes can be used. Also, a different number of small hoppers, corresponding to the number of lanes, can be used.

In addition, the bag holder has been described as having a foot that moves downward based on the degree to which the supported bag is filled. However, the foot's movement may be based on the number of objects loaded into the bag, as determined by the control unit. In this way, the control unit relates the lowering of the foot to the number of objects in the bag to reduce the distance that the objects fall when fed into the bag, and thereby minimizing bruising of the objects.

What is claimed is:

1. A container loading apparatus to facilitate loading of objects into a container, comprising:
    a container loading element configured to receive and load the objects transported by the transporting element, the container loading element including
        a container holding element configured to hold the container to be filled with the objects, and
        a foot element configured to moveably support the container at a plurality of different positions; and
    a controller connected to control the transporting element and the container loading element, the controller including
        means for initially placing the foot element at an uppermost position,
        means for counting a number of objects loaded into the container,
        means for incrementally lowering the foot element based on the counted number of the objects loaded into the container, and
        means for notifying an operator that the container is filled with objects to at least a predetermined weight.

2. The container loading apparatus of claim 1, further comprising hopper elements configured to permit the objects from the transporting element to be loaded into the container by the container loading element when in a first position, to prevent the objects from being loaded into the container when in a second position, and to rapidly load a single object into the container when in a third position different from the first and second positions.

3. The container loading apparatus of claim 2, wherein the hopper elements include
    means for transmitting a signal to the controller as each one of the objects passes through the hopper elements in the first position.

4. The container loading apparatus of claim 3, wherein the counting means includes
    means for counting the number of objects based on the transmitted signals from the hopper elements.

5. The container loading apparatus of claim 2, wherein the controller further includes
    means for placing the hopper elements in the second position after a predetermined number of objects have been loaded into the container.

6. The container loading apparatus of claim 5, wherein the hopper elements include
    means for determining a weight of the objects when in the second position.

7. The container loading apparatus of claim 6, wherein the notifying means includes
    means for identifying at least one of the objects weighed by the hopper elements based on the weight determined by the weight determining means, and
    means for placing at least one of the hopper elements in the third position to quickly load the identified at least one object into the container by the container loading element.

8. The container loading apparatus of claim 7, wherein the identifying means includes
    means for designating the at least one object so that a weight of the container exceeds the predetermined weight by a smallest amount.

9. The container loading apparatus of claim 1, wherein the container loading element includes
    a container weighing element configured to determine a weight of the container and to report the weight to the controller.

10. The container loading apparatus of claim 1, wherein the controller further includes
    means for lowering the foot element to a lowest position to facilitate removal of the container filled with the objects.

11. A foot device for minimizing bruising of objects as the objects are automatically loaded into a bag by an object bagging system, comprising:
    means for supporting a bag to be loaded with the objects;
    means for loading the objects into the bag; and
    means for regulating a position of the bag supporting means as the bag is loaded with the objects, the regulating means including
        means for initially placing the bag supporting means at an uppermost position,
        means for counting a number of objects loaded into the bag, and
        means for incrementally lowering the bag supporting means based on the counted number of the objects loaded into the bag.

12. The foot device of claim 11, wherein the regulating means further includes
    means for lowering the bag supporting means to a lowest position to facilitate removal of the bag loaded with the objects after the number of objects loaded into the bag reaches at least a predetermined number.

13. The foot device of claim 11, wherein the regulating means includes a motor.

14. A method for minimizing bruising of objects as the objects are automatically loaded into a bag by an object bagging system, comprising the steps of:
    supporting a bag to be loaded with the objects using a foot device;
    initially placing the foot device at an uppermost position;
    loading the bag with objects;
    counting a number of objects loaded into the bag; and
    incrementally lowering the foot device based on the counted number of the objects loaded into the bag.

15. The method of claim 14, further comprising the step of lowering the foot device to a lowest position to facilitate removal of the bag loaded with the objects after the number of objects loaded into the bag reaches at least a predetermined number.

16. A bagging system to facilitate bagging of objects, comprising:

a conveyor configured to carry the objects to be bagged;

a plurality of hoppers configured to permit the objects from the conveyor to freely flow through the hoppers when in a first position, to prevent the objects from flowing through the hoppers when in a second position, and to rapidly discharge at least one of the objects when in a third position different from the first and second positions, at least one of the hoppers holding a single object when in the second position and rapidly discharging the single object when in the third position;

a plurality of hopper weighing elements, corresponding to the plurality of hoppers, configured to determine a weight of the objects held by corresponding ones of the hoppers when in the second position;

a bagging element configured to bag the objects, the bagging element including
a bag clamping element configured to hold a bag, and
a foot element configured to moveably support the bag at a plurality of different positions; and a controller connected to the conveyor, the hoppers, the hopper weighing elements, and the bagging element, the controller including
means for initially placing the hoppers in the first position and the foot element at an uppermost position,
means for counting a number of objects loaded into the bag,
means for incrementally lowering the foot element based on the number of objects loaded into the bag,
means for placing the hoppers in the second position when the counting means determines that the bag contains a predetermined number of objects, and
means for selecting at least one of the hoppers depending upon the weight of the objects held by the hoppers as determined by the plurality of hopper weighing elements, and for placing the selected at least one hopper in the third position to rapidly discharge the single object from the selected at least one hopper.

17. The bagging system of claim 16, wherein the bagging element further includes a bag weighing element configured to determine a weight of the bag.

18. The bagging system of claim 17, wherein the hopper weighing elements include means for generating a count signal each time an object flows through the hoppers when in the first position; and wherein the counting means includes
means for counting the number of objects using the count signals from the hopper weighing elements.

19. The bagging system of claim 16, wherein the controller further includes means for lowering the foot element to a lowest position to facilitate removal of the bag filled with objects.

20. The bagging system of claim 16, wherein the bagging element further includes an object detecting element configured to detect the presence of an object near an opening of the bag; and wherein the incrementally lowering means includes means for lowering the foot element each time the object detecting element detects an object near the bag opening.

* * * * *

UNITED STATES PATENT AND TRADEMARK OFFICE
CERTIFICATE OF CORRECTION

PATENT NO.: 6,012,270
DATED: January 11, 2000
INVENTOR: Jeffrey A. VINE

It is certified that error appears in the above-identified patent and that said Letters Patent is hereby corrected as shown below:

Title page, item
[75] "Inventor: Jeffrey A. Vine, Broadway, VA." should read --Inventor: Jeffrey A. Vine, Hillsboro, OR--.

Claim 1, Col. 7, line 30, after "comprising:", insert --a transporting element configured to transport the objects to be loaded into the container;--.

Signed and Sealed this

Tenth Day of April, 2001

*Attest:*

NICHOLAS P. GODICI

*Attesting Officer*    *Acting Director of the United States Patent and Trademark Office*